(12) United States Patent
Herrington

(10) Patent No.: US 11,279,636 B2
(45) Date of Patent: Mar. 22, 2022

(54) BRINE FEED SYSTEM

(71) Applicant: Aqua Research LLC, Albuquerque, NM (US)

(72) Inventor: Rodney E Herrington, Albuquerque, NM (US)

(73) Assignee: Aqua Research LLC, Albuquerque, NM (US)

(*) Notice: Subject to any disclaimer, the term of this patent is extended or adjusted under 35 U.S.C. 154(b) by 0 days.

(21) Appl. No.: 16/820,241

(22) Filed: Mar. 16, 2020

(65) Prior Publication Data
US 2020/0216336 A1 Jul. 9, 2020

Related U.S. Application Data

(63) Continuation of application No. 15/737,752, filed as application No. PCT/US2016/039752 on Jun. 28, 2016, now abandoned.

(60) Provisional application No. 62/186,270, filed on Jun. 29, 2015.

(51) Int. Cl.
| | |
|---|---|
| *C25C 7/02* | (2006.01) |
| *C02F 1/467* | (2006.01) |
| *C25B 1/26* | (2006.01) |
| *C25B 15/02* | (2021.01) |
| *C02F 5/00* | (2006.01) |

(52) U.S. Cl.
CPC .............. *C02F 1/4674* (2013.01); *C25B 1/26* (2013.01); *C25B 15/02* (2013.01); *C02F 5/00* (2013.01); *C02F 2201/46135* (2013.01); *C02F 2201/46145* (2013.01); *C02F 2209/40* (2013.01)

(58) Field of Classification Search
CPC .... C25C 7/02; C25C 3/08; C25B 1/26; C25B 9/00; C25D 21/14; C25D 17/00; C25D 17/002
USPC ......................................................... 204/233
See application file for complete search history.

(56) References Cited

U.S. PATENT DOCUMENTS

| | | |
|---|---|---|
| 6,192,911 B1 | 2/2001 | Barnes |
| 8,491,775 B1 | 7/2013 | Barnes |
| 2009/0211919 A1 | 8/2009 | Hegel |

*Primary Examiner* — Zulmariam Mendez
(74) *Attorney, Agent, or Firm* — V. Gerald Grafe

(57) ABSTRACT

The present invention relates to an electrolytic cell producing oxidants that utilizes a vacuum venturi system to meter saturated brine to the water stream to produce the correct conductivity electrolyte for operation of the electrolytic cell. The present invention comprises a venture eductor configured to accept brine from a brine source and to communicate brine to the chlorine generation system, a first control device to discourage communication of brine from the venture eductor to the brine source, and a second control device to control the rate of flow of brine from the brine source to the venture eductor.

6 Claims, 2 Drawing Sheets

BRINE FEED SYSTEM

CROSS REFERENCE TO RELATED APPLICATIONS

This application claims priority as a continuation of U.S. application Ser. No. 15/737,752, filed 18 Dec. 2017, which was a national stage application under 35 USC371 of PCT/US2016/039752; and to U.S. Provisional 62/186,270, filed 29 Jun. 2015, to which the preceding claimed priority. Each of the preceding is incorporated herein by reference.

FIELD OF THE INVENTION

The present invention relates to an electrolytic cell producing oxidants that utilizes a vacuum venturi system to meter saturated brine to the water stream to produce the correct conductivity electrolyte for operation of the electrolytic cell.

BACKGROUND

Electrolytic technology utilizing dimensionally stable anodes (DSA) has been used for years for the production of chlorine and other mixed-oxidant solutions. Dimensionally stable anodes are described in U.S. Pat. No. 3,234,110 to Beer, entitled "Electrode and Method of Making Same," whereby a noble metal coating is applied over a titanium substrate.

An example of an electrolytic cell with membranes is described in U.S. Patent RE 32,077 to deNora, et al., entitled "Electrode Cell with Membrane and Method for Making Same," whereby a circular dimensionally stable anode is utilized with a membrane wrapped around the anode, and a cathode concentrically located around the anode/membrane assembly.

An electrolytic cell with dimensionally stable anodes without membranes is described in U.S. Pat. No. 4,761,208 to Gram, et al., entitled "Electrolytic Method and Cell for Sterilizing Water."

Commercial electrolytic cells have been used routinely for oxidant production that utilize a flow-through configuration that may or may not be under pressure that is adequate to create flow through the electrolytic device. Examples of cells of this configuration are described in U.S. Pat. No. 6,309,523 to Prasnikar, et al., entitled "Electrode and Electrolytic Cell Containing Same," and U.S. Pat. No. 5,385,711 to Baker, et al., entitled "Electrolytic Cell for Generating Sterilization Solutions Having Increased Ozone Content," and many other membrane-type cells.

In other configurations, the oxidant is produced in an open-type cell or drawn into the cell with a syringe or pump-type device, such as described in U.S. Pat. No. 6,524,475 to Herrington, et al., entitled "Portable Water Disinfection System."

U.S. Pat. No. 7,005,075 to Herrington, et al., entitled "Gas Drive Electrolytic Cell," teaches a disinfection device that incorporates an electrolyte solution and a gas head space within a closed electrolytic cell chamber. During electrolysis of electrolyte to a disinfectant solution, hydrogen gas is generated within the closed electrolytic cell thereby generating pressure within the closed cell. Upon completion of electrolysis of the electrolyte solution to produce the disinfectant solution, a discharge port on the electrolytic cell housing is opened. Gas pressure within the cell housing provides the motive force to expel all or most of the disinfectant out of the cell housing to such a point where the disinfectant solution is utilized. By definition, this device operates in batch mode.

U.S. Pat. No. 7,922,890 to Sanchez, et al, entitled "Low Maintenance On-Site Generator" describes methods for precisely controlling water flow to an electrolytic cell system in order to maintain stable water flow conditions to the cell. This patent teaches a fully saturated brine metering system utilizing a variable speed brine pump.

DESCRIPTION OF INVENTION, MODES FOR CARRYING OUT THE INVENTION AND INDUSTRIAL APPLICABILITY

The present invention relates to an electrolytic cell producing oxidants that utilizes a vacuum venturi system to meter saturated brine to the water stream to produce the correct conductivity electrolyte for operation of the electrolytic cell. The present invention comprises a venture eductor configured to accept brine from a brine source and to communicate brine to the chlorine generation system, a first control device to discourage communication of brine from the venture eductor to the brine source, and a second control device to control the rate of flow of brine from the brine source to the venture eductor. The first flow device can comprise, as an example, a check valve. The second control device can comprise, as examples, one or more of a manual valve, a solenoid controlled valve, an air controlled valve, and a motor controlled valve.

Figure 1:
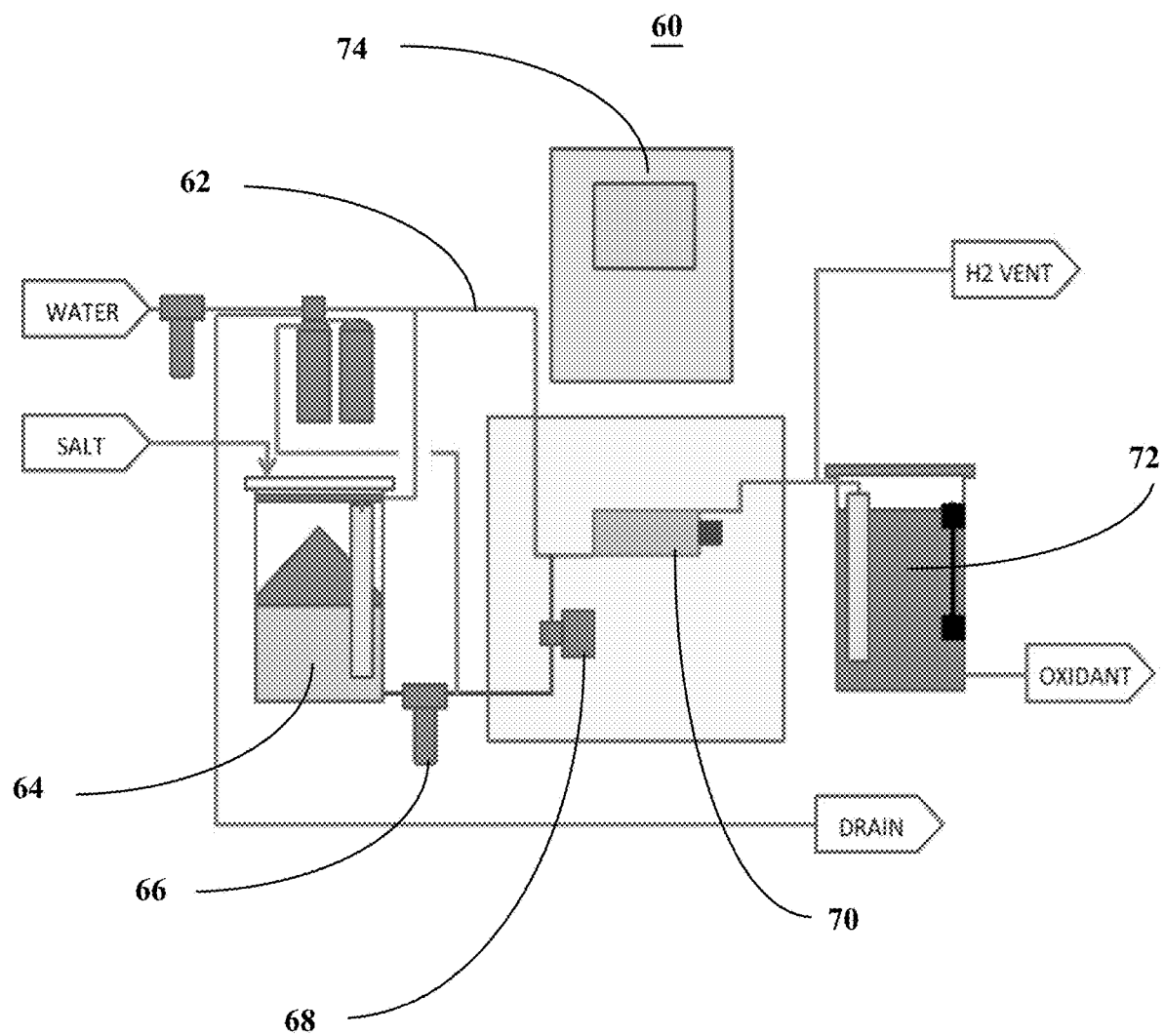
FIG. 1 is a control scheme for an electrolytic on-site generation system utilizing a variable control brine feed pump to meter brine to an electrolytic cell.

FIG. 1 represents a commercial system of the present art 60 that uses a variable speed gear type brine metering pump 68 or a bellows type pump to meter brine into main water stream 62 entering electrolytic cell 70 where brine is converted to halogen oxidants that are transferred to oxidant tank 72. Brine generation is produced in brine generator 64, passes through brine filter 66 and is metered by brine pump 68 to achieve the appropriate concentration for electrolysis in cell 70. All operations are controlled automatically by power supply/controller system 74.

Figure 2:
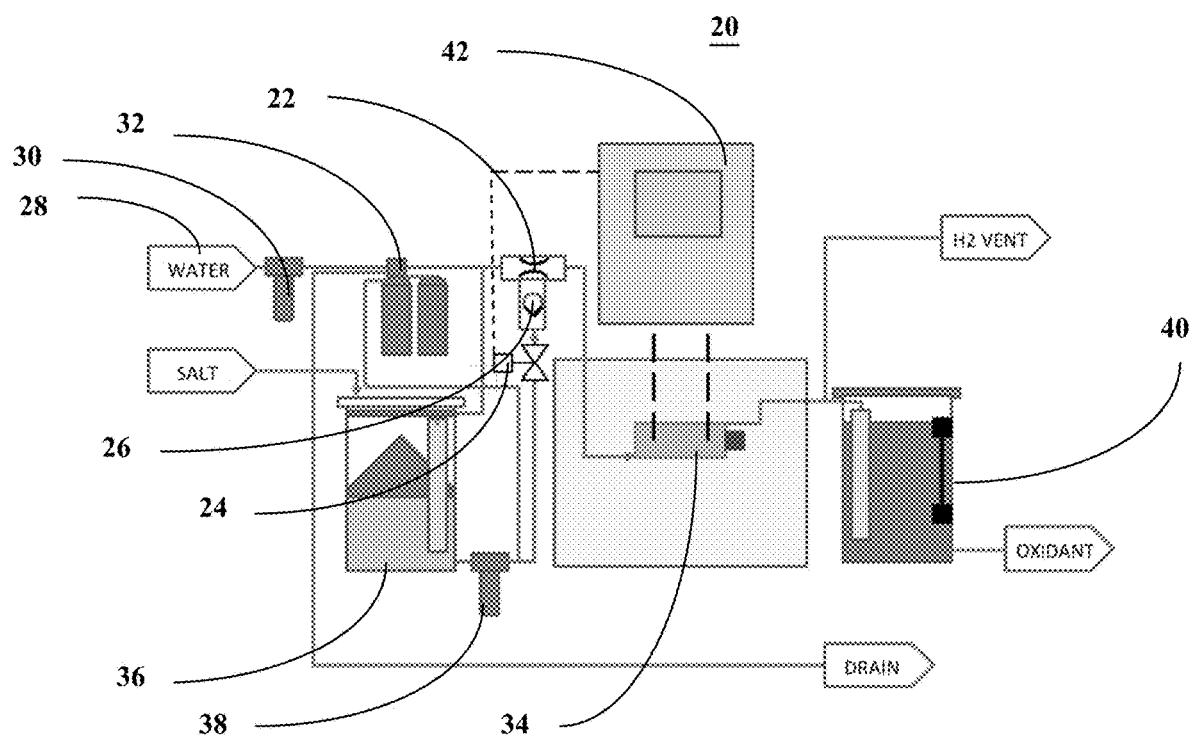
FIG. 2 is a control scheme for an electrolytic on-site generation system utilizing a venturi injector and variable control solenoid valve to meter brine to an electrolytic cell.

In an example embodiment of the present invention shown in system 20 in FIG. 2, brine from brine generator 32 is metered in to water supply 28 via venturi 22 that creates a vacuum on the brine source in brine generator 36 and said brine is filtered by filter 38 which is then drawn by vacuum through variable control valve 24 into venturi 22. Feed water is cleaned by water filter 30 and calcium is removed from the water via water softener 32 to eliminate scale buildup in cell 34. To control back flow of water to brine generator 36 under certain operating or standby conditions, check valve 26 precludes back flow of water to brine generator 36. Power supply/controller 42 precisely controls the flow of fully saturated brine to the water fluid stream entering electrolytic cell 34 via an analog control scheme that precisely opens and controls variable control valve 24 to maintain the correct electrical conductivity in cell 34 for electrolysis. Current methods of brine fluid control in the industry use expensive pumps to precisely meter the brine to the main water stream. The present invention is a much simpler and lower cost method and has no pump components to wear out, thereby making the brine metering process simpler, lower cost, and much more reliable. The system can be manually controlled or can be automated and simplified for the operator. The control scheme for electrolytic systems today utilize amperage or voltage monitoring systems at the electrolytic cell which are controlled by a power supply/controller 74 like that shown in FIG. 1. For voltage controlled systems, brine metering pump 68 can be, for example, a bellows type pump that is set to operate at a fixed flow rate. To control consistent concentration of oxidant from the electrolytic cell, in some cases sodium hypochlorite, the voltage applied to the cell is adjusted to maintain the correct amperage value in the electrolytic cell. In this manner, as the cell loses efficiency, for example due to carbonate scale buildup on the cathode electrode in cell 70, energy efficiency is lost due to the application of more power to the cell. However, brine conversion efficiency is maintained. In an alternate example control scheme, voltage is maintained constant and the conductivity of the electrolyte in the cell is adjusted to maintain the correct amperage on the cell. Conductivity is adjusted by varying the rate of concentrated brine flow to the water stream entering cell 70 to increase conductivity as cell 70 loses efficiency. In the present art, the concentrated brine flow is adjusted, or varied, by utilizing a gear type brine pump that is driven by a variable speed motor. The control scheme monitors the cell amperage. If the amperage drops below a defined value, the control system sends a signal to brine pump motor 68 to increase speed. In this manner more fully saturated brine is metered to the water stream entering cell 70, the conductivity of the electrolyte (water and brine) entering cell 70 will allow more amperage to flow from the anode to the cathode electrodes in cell 70, thereby increasing the power drawn from power supply/controller 74. In this manner, the concentration of the oxidant produced in cell 70 will be maintained. This allows a consistent concentration of oxidant delivered to oxidant storage tank 72. Consistent concentration of oxidant in oxidant storage tank 72 allows consistent metering of oxidant to the water source being disinfected so that the dose of oxidant to the main water source is consistent.

In the example embodiment of the present invention shown in FIG. 2, a venturi injector 22 such as those manufactured by Mazzei Corporation, is mounted in water line 28 feeding water to electrolytic cell 34. A vacuum is created in the throat of venturi injector 22. The vacuum port on venturi injector 22 is connected to saturated brine feed tank 36. Check valve 26 can be incorporated in venturi injector 22 vacuum port so that water flowing in venturi injector 22 cannot flow out the vacuum port when the flow of water in venturi injector 22 is static. The vacuum port on venturi injector 22 is also connected to variable control valve 24 which is then routed to brine generator 36 that converts dry halide salt (typically sodium chloride) to fully saturated brine. Electrolytic cell 34 in this scheme has a fixed voltage applied. Power supply/controller 42 monitors amperage applied to cell 34. If the amperage is below a predefined value, then the control scheme opens variable control valve 24 slightly to increase the flow of brine through variable control valve 24. In this way the brine concentration of the fluid entering cell 34 is increased thereby increasing the conductivity of the solution (electrolyte) entering cell 34 which thereby increases the amperage draw on cell 34. In this manner, the concentration of the halide oxidant produced in cell 34, typically sodium hypochlorite or mixed oxidants, is increased. Conversely, if the amperage in cell 34 is too high, power supply/controller 42 reduces the flow of brine through variable control valve 24 thereby decreasing the conductivity of the electrolyte. With this scheme, the concentration of the oxidant produced in electrolytic cell 34 can be maintained within a few small percentage points of the desired concentration set point for the oxidant in oxidant storage tank 40.

Other objects, advantages and novel features, and further scope of applicability of the present invention will become apparent to those skilled in the art upon examination of the present specification, claims, and figures, or can be learned by practice of the invention. The objects and advantages of the invention can be realized and attained by means of the instrumentalities and combinations particularly pointed out in the appended claims.

The invention claimed is:

1. A chlorine generation system comprising: (a) a brine source; (b) a water source; (c) a variable flow control device accepting brine from the brine source; (d) a check valve accepting brine from the variable control valve and configured to prevent brine flow from the check valve to the variable flow control device; (e) a venturi eductor accepting water from the water source and brine from the check valve; (f) an electrolytic cell configured to accept diluted brine from the venturi eductor; (g) a sensor configured to provide a signal representative of (i) the voltage required by the electrolytic cell, or (ii) the current required by the electrolytic cell, or (iii) a combination thereof; (h) wherein the variable flow control device is configured to control flow of brine therethrough responsive to the signal.

2. The chlorine generation system of claim 1, wherein the variable control valve controls the flow of brine responsive to the signal such that the concentration of oxidant produced in the electrolytic cell is maintained at a predetermined level.

3. The chlorine generation system of claim 1, wherein the (g) sensor is configured to provide a signal representative of the current required by the electrolytic cell.

4. The chlorine generation system of claim 1, wherein the variable flow control device comprises a variable control solenoid valve.

5. The chlorine generation system of claim 1, wherein the variable flow control device comprises a motor-controlled valve.

6. The chlorine generation system of claim 1, wherein the variable flow control device comprises an air-controlled valve.

* * * * *